July 31, 1951  D. W. HOUSTON, JR  2,562,790
ELECTRIC FOOD MIXER
Original Filed May 6, 1941  3 Sheets-Sheet 1
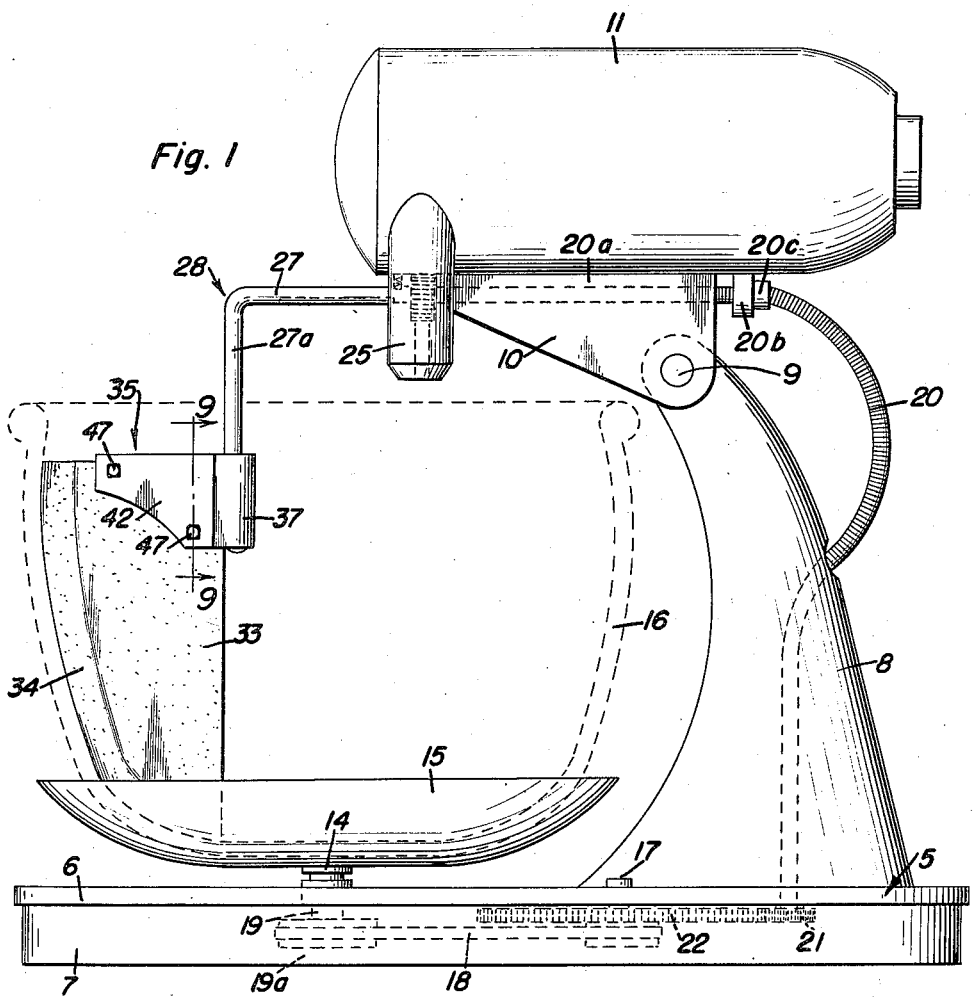
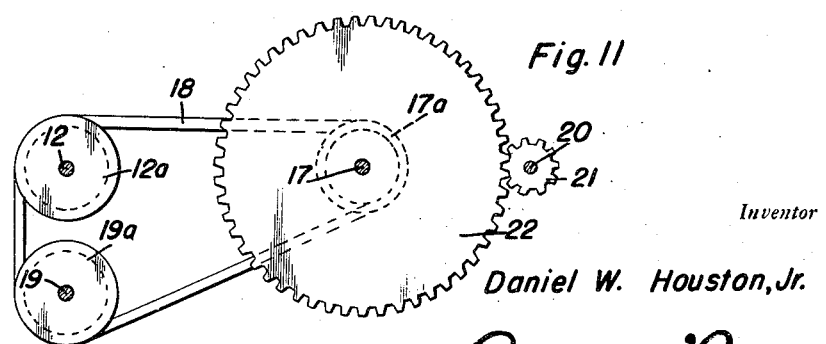
Inventor
Daniel W. Houston, Jr.
By Clarence A. O'Brien
and Harvey B. Jacobson
Attorneys July 31, 1951  D. W. HOUSTON, JR  2,562,790
ELECTRIC FOOD MIXER
Original Filed May 6, 1941  3 Sheets-Sheet 2
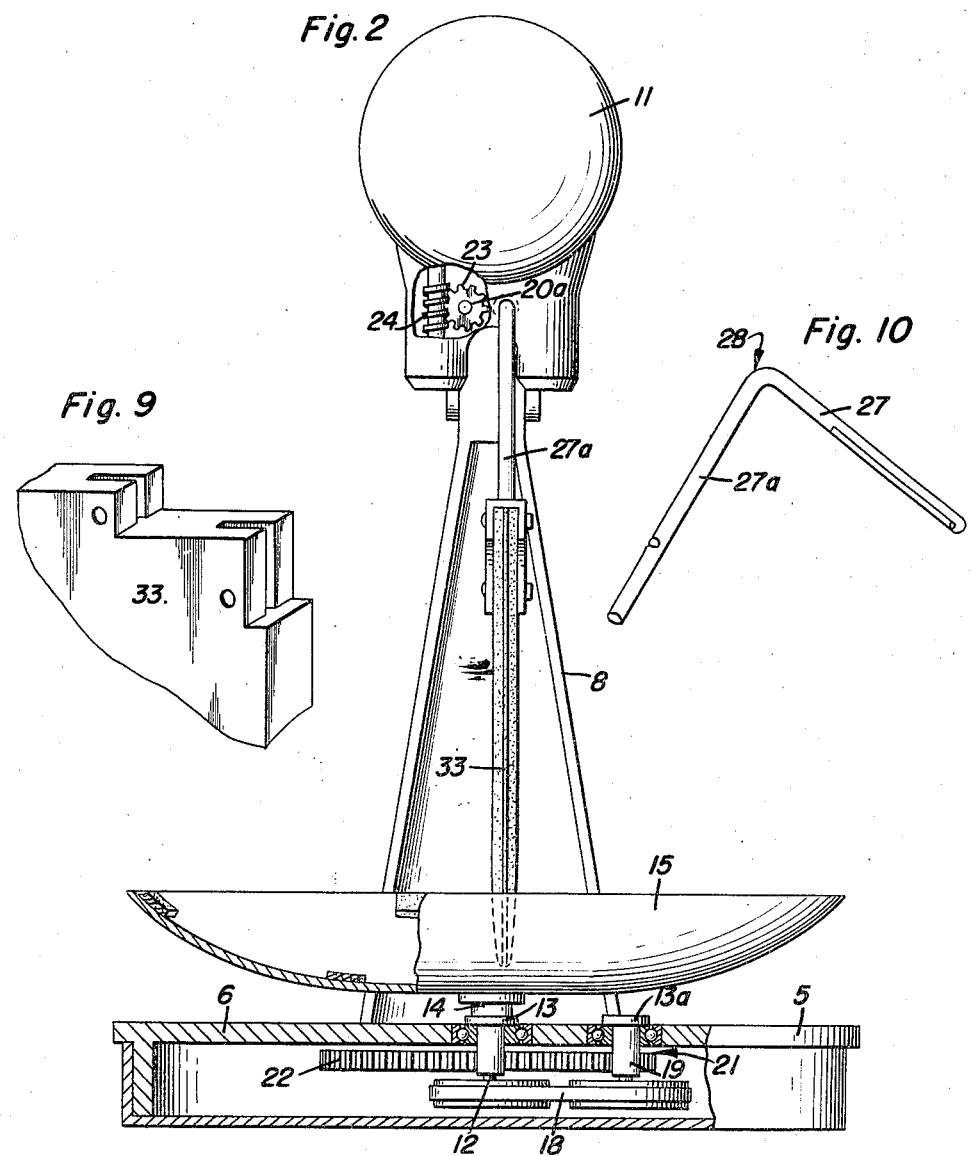
Inventor
Daniel W. Houston, Jr.
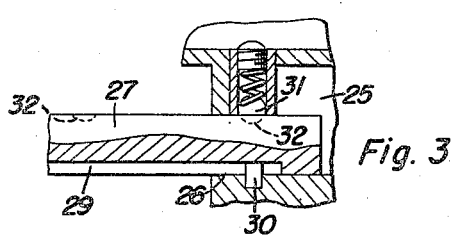
Attorneys

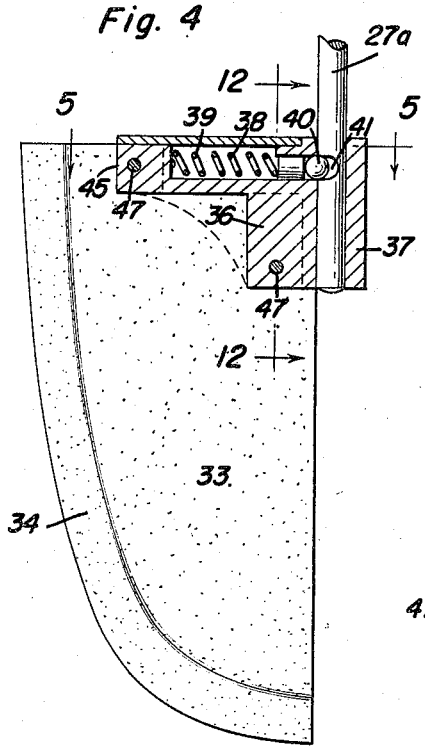
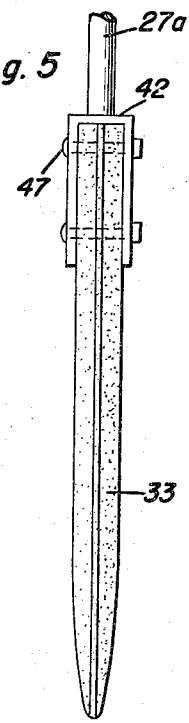
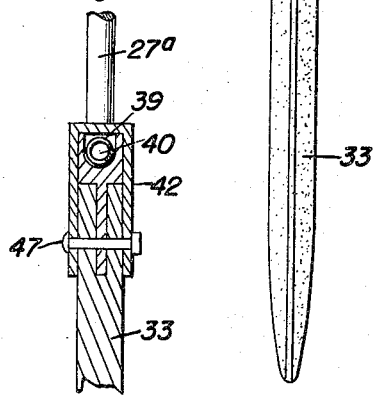
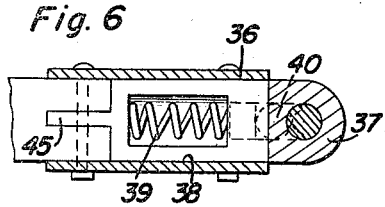
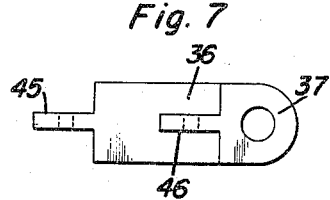
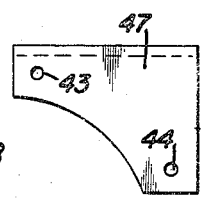
Inventor
Daniel W. Houston, Jr.

Patented July 31, 1951

2,562,790

UNITED STATES PATENT OFFICE 2,562,790

ELECTRIC FOOD MIXER

Daniel W. Houston, Jr., Bessemer, Ala.

Substituted for application Serial No. 392,141, May 6, 1941. This application September 11, 1950, Serial No. 184,305

2 Claims. (Cl. 259—88)

This invention relates to household mixers of the type provided for efficient mixing and beating of comestibles, beverages and the like, and is a substitute application for the abandoned application Serial No. 392,141, filed May 6, 1941.

An object of this invention is to provide a power driven household mixer which includes improved means for supporting the bowl thereof, and for rotating the bowl in a manner to insure a thorough mixing of the contents in the bowl.

Another object of the invention is to provide an improved scraper element for maintaining the interior wall of the bowl of the mixer free from the contents of the bowl, and for urging such contents inwardly towards the center of the bowl during the mixing operation to insure a thorough mixing of the contents in the bowl.

Still further objects of the invention reside in the provision of an electric food mixer that is strong, durable, highly efficient in operation, simple in construction and manufacture, and which is capable of being manufactured at a relatively low cost.

These, together with the various ancillary objects of the invention which will become apparent as the following description proceeds, are obtained by this electric food mixer, a preferred embodiment of which has been illustrated in the accompanying drawings, by way of example only, wherein:

Figure 1 is a side elevational view of the mixer embodying the features of the present invention;

Figure 2 is a front elevational view of the mixer with certain parts thereof broken away and shown in section;

Figure 3 is a fragmentary detailed sectional view showing the manner of securing the bracket arm for the scraper blade;

Figure 4 is a side elevational view of the scraper blade, with certain parts shown in section and illustrating the manner of detachably securing the scraper blade to its bracket arm;

Figure 5 is an edge elevational view of the scraper blade;

Figure 6 is a top plan view of a spring catch assembly forming part of the means for securing the scraper blade to its bracket arm;

Figure 7 is a bottom plan view of the casing forming part of the catch assembly shown in Figure 6;

Figure 8 is a side elevational view of a cover plate for the casing of the spring catch assembly;

Figure 9 is a perspective detail of the upper portion of the blade with the housing assembly removed therefrom;

Figure 10 is a perspective detail of the L-shaped bracket; and

Figure 11 is a plan view of the power transmission means as will be hereinafter more fully described.

Figure 12 is a vertical sectional view as taken along the plane of line 12—12 in Figure 4.

Referring more in detail to the drawings it will be seen that in accordance with the present invention there is provided a hollow base indicated generally by the reference numeral 5 and composed of a pair of telescoping sections 6 and 7, which can be readily separated to permit access to the interior of the base.

Rising from the base 5 adjacent one end thereof is a pedestal 8 to the upper end of which is pivoted, as at 9, a bracket 10 provided on the casing of an electric motor 11 through the medium of which the motor 11 is mounted on the pedestal 8 to swing in a vertical plane.

Journaled in the top section 6 of the base at a suitable point remote from the pedestal 8 is a vertical stub shaft 12 that is provided in the upper end thereof with a polygonal shaped socket 13 that is adapted to accommodate a correspondingly shaped stem 14 provided on the bottom of a revoluble platform 15.

The platform 15 is somewhat "saucer-shaped" having the top part thereof dished out to accommodate a mixing bowl or the like 16 as suggested in Figure 1.

Also journaled in the top section 6 of the base laterally of the shaft 12 is a similar stub shaft 19 that at its upper end is equipped with a socket 13a to accommodate the stem 14 of the platform 15 when it is desired to so position the platform 15 as may be required due to the size of the mixing bowl that may be employed.

The shaft 19 is equipped with a pulley 19a, and the shaft 12 is equipped with a pulley 12a.

The shafts 12 and 19 are driven from a vertical drive shaft 17 suitably journaled in the top section 6 of the platform 5; shaft 17 being equipped with a pulley 17a over which is trained a drive belt 18 that is also trained over the pulleys 12a and 19a respectively, as best shown in Figure 11.

The shaft 17 is driven from the electric motor 11 through the medium of a flexible shaft 20 that at one end terminates within the base 5 and at said end is equipped with a pinion gear 21 that is in mesh with a large gear wheel 22 mounted on the stub shaft 17.

The flexible shaft 20 embodies a shaft section 20a that is suitably journaled on the basing of the motor 11 through the medium of bearing 20b, and at one end has a detachable connection with the main length of the shaft 20, as at 20c.

At the end remote from the coupling 20c shaft section 20a is provided with a pinion gear 23 that is in mesh with a worm 24 journaled in the casing of the motor 11 and operatively connected in any suitable manner with the armature shaft of the motor 11, and as suggested in Figure 2.

It will thus be seen that drive is transmitted from the motor 11 through the gearing 24, 23 and shaft sections 20, 20a in association with the gearing 21, 22 to the shaft 17, and from the shaft 17 through the belt and pulley drive connection 18 to the platform 15 for revolving the latter.

Also in accordance with the present invention the motor casing 11 has integral therewith a depending socket formation 25 that has a lateral opening 26 through which one end of the arm 27 of a substantially L-shaped bracket 28 is insertible into the socket.

The bracket arm 27 is retained against rotative movement through the medium of a way 29 provided in the underside of the arm 27 and co-acting with a key 30 provided in the bottom portion of the socket 25, as clearly shown in Figure 3.

Also the arm 27 of the bracket 28 is secured in the desired position lengthwise of the arm relative to the socket 25 through the medium of a spring detent 31 cooperable with recesses 32 provided at spaced intervals on the arm 27 as shown in Figure 3.

The arm 27a of the bracket 28 is adapted to have detachably secured thereto a scraper blade indicated generally by the reference numeral 33.

Preferably the blade 33 is formed of rubber or suitable flexible or elastic material and has an edge portion 34 that conforms with the vertical cross sectional shape of the wall of the mixing bowl 16 to have a working, wiping contact with the interior of the wall of the bowl 16 as the latter revolves for scraping such contents of the bowl as would have a tendency to cling to the wall thereof during the mixing operation.

At an upper corner thereof the blade 33 is equipped with a latch assembly indicated generally by the reference numeral 35 for detachably securing the blade 33 to the aforementioned arm 27a of bracket 28.

The assembly 33 embodies a housing 36 of somewhat angular form that is molded with the body of the blade 33, and embodies a vertical, integral sleeve portion 37 that is adapted to be sleeved on the arm 27a as shown in Figure 6.

The housing part 36 is also formed in the top thereof with a chamber 38 that houses a spring 39 for a ball detent 40 that is cooperable with a recess 41 in the arm 27 in a manner clearly shown in Figure 6 for detachably securing the blade 33 on the bracket arm 27a.

Access to the chamber 38 is had through the top thereof, as shown in Figure 8, and the open top of the chamber 38 is closed through the medium of a substantially U-shaped cover plate 42.

The cover plate 42 straddles the blade 33 with the web or bight portion of the plate disposed over the top of the chamber 38 as suggested in Figure 6 for normally closing the chamber.

Opposed sides of the cover plate 42 are provided with apertures 43, 44 that align with apertured lugs 45, 46 provided on the housing 36 to accommodate screws or other fastening elements 47, and through the medium of which the housing 36 is positively secured in association with the blade 33, and the cover plate 42 positively secured in position with respect to the housing 36 and the blade 33.

It will thus be seen that in order to properly associate the blade 33 with the bracket arm 27 all that is necessary is to sleeve the sleeve part 37 onto the arm 27a and the detent 40 will snap into the recess 41 thus securely retaining the blade 33 in association with the arm 27a.

It will also be seen that the bracket 28 may be adjusted radially with respect to the center of the bowl 16, as the diameter of the bowl may require in order to bring the working edge 34 of the blade into proper wiping engagement with the inner surface of the wall of the bowl 16. Thus a bowl of practically any size may be used.

Also the blade 33 may be adjusted radially inwardly from the wall of the bowl 16 in a manner to permit the motor 11, and associated parts to be tilted back on the pivot 9, and as may be desired for any one of several purposes not necessary to mention.

It will also be seen that in actual practice, with the motor running, the platform 15 will revolve at a suitable speed carrying with it the bowl 16 and as the bowl 16 and platform 15 revolve the blade 33 will have the edge 34 thereof in wiping engagement with the interior of the wall of the bowl for scraping the contents of the bowl from the wall, and urging such contents towards the center of the bowl to insure thorough and proper mixing of such contents.

It will also be apparent that the blade 33 may be readily disassociated from the bracket 28 for cleaning and sterilizing purposes.

It is thought that the many advantages of a food mixer embodying the features of the present invention will be apparent without further detailed description.

It will also be understood that while I have herein illustrated and described the preferred embodiment of the invention, changes may be made therein by those skilled in the art without materially departing from the invention as herein illustrated and described.

Having thus described the invention, what is claimed as new is:

1. In a mixing device of the character described, a substantially hollow base constituting a housing, a vertical shaft journaled in the top of the base, a platform connected with said shaft to rotate therewith, a pedestal rising from the base, a prime mover pivotally supported on said pedestal for vertical swinging movement and embodying a casing having a socket, a bracket arm having an end portion detachably secured in said socket and a second depending end portion, said revoluble platform adapted to have a mixing bowl positioned thereon for revolving movement with the platform, a scraper blade on the depending end portion of said bracket arm for positioning within such mixing bowl for wiping engagement with the wall of the bowl, power transmission means housed within said base and operatively connected with said vertical shaft, and driving means operatively connecting said prime mover with said power transmission means.

2. In a mixing device of the character described, a base, a pedestal rising from said base, a bowl supporting platform revolubly mounted on said base, means mounted on said pedestal embodying a socket equipped with a spring pressed detent, an L-shaped bracket having an arm insertable in said socket equipped with means to be engaged by said detent for securing said arm at the desired position of adjustment in engagement with said socket, said bracket having a depending vertical arm, and a scraper blade detachably connected with the vertical arm of said bracket for positioning within the bowl on the platform for wiping engagement with the rim of the bowl as the bowl and platform revolve, and means for detachably connecting the blade with the second-named arm of said bracekt including a sleeve adapted to be sleeved on said arm of the bracket, and a detent carried by said sleeve and coacting with a recess in said arm for detachably securing said sleeve in position on said arm; and said blade being formed substantially wholly of flexible material.

DANIEL W. HOUSTON, Jr.

REFERENCES CITED

The following references are of record in the file of this patent:

UNITED STATES PATENTS

| Number | Name | Date |
|---|---|---|
| 414,632 | Crail | Nov. 5, 1889 |
| 1,302,923 | Hills | May 6, 1919 |
| 1,733,291 | Aastrup | Oct. 29, 1929 |
| 1,772,083 | Hollenback | Aug. 5, 1930 |